(12) United States Patent
Bunger et al.

(10) Patent No.: US 8,799,533 B2
(45) Date of Patent: *Aug. 5, 2014

(54) UNIVERSAL SERIAL BUS ASSISTANCE ENGINE

(71) Applicant: Samsung Electronics Co., Ltd., Suwon (KR)

(72) Inventors: Nils Bunger, Stanford, CA (US); Aly E. Orady, San Francisco, CA (US); Matthew B. Debski, Sunnyvale, CA (US); Pankaj Garg, Union City, CA (US); Dali Kilani, Palo Alto, CA (US); Teju Khubchandani, Milpitas, CA (US); Himadri Choudhury, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,678

(22) Filed: Sep. 30, 2013

(65) Prior Publication Data

US 2014/0032789 A1      Jan. 30, 2014

Related U.S. Application Data

(63) Continuation of application No. 13/566,953, filed on Aug. 3, 2012, now Pat. No. 8,560,743, which is a continuation of application No. 12/082,968, filed on Apr. 15, 2008, now Pat. No. 8,260,985.

(60) Provisional application No. 60/997,842, filed on Oct. 5, 2007.

(51) Int. Cl.
*G06F 13/00* (2006.01)
*G06F 3/00* (2006.01)
*G06F 13/12* (2006.01)
*G06F 13/38* (2006.01)

(52) U.S. Cl.
USPC ............................... 710/33; 710/11; 710/62

(58) Field of Classification Search
USPC .............................................. 710/62, 11, 33
See application file for complete search history.

(56) References Cited

U.S. PATENT DOCUMENTS

| | | | |
|---|---|---|---|
| 5,748,875 A | 5/1998 | Tzori | |
| 6,311,228 B1 | 10/2001 | Ray | |
| 6,708,247 B1 | 3/2004 | Barrett et al. | |
| 6,862,285 B1 | 3/2005 | Jeffrey et al. | |
| 7,631,126 B2 | 12/2009 | Barake et al. | |
| 2002/0116565 A1 | 8/2002 | Wang et al. | |
| 2002/0145051 A1 | 10/2002 | Charrin | |
| 2003/0088727 A1 | 5/2003 | Zarns | |
| 2003/0105606 A1 | 6/2003 | Poley et al. | |
| 2004/0044751 A1 | 3/2004 | Doraisamy | |
| 2004/0181690 A1 | 9/2004 | Rothermel et al. | |
| 2004/0254014 A1 | 12/2004 | Quraishi et al. | |

(Continued)

OTHER PUBLICATIONS

Watts, et al., Implementing the IBM BladeCenter HC10 Workstation Blade, Redpaper, Mar. 2008.

(Continued)

*Primary Examiner* — Farley Abad
(74) *Attorney, Agent, or Firm* — Sughrue Mion, PLLC

(57) ABSTRACT

A method to interact with a local USB device is disclosed. A message is received from the local USB device. Predetermined information is extracted from a proper subset of the message. The extracted information is transmitted to a local process.

5 Claims, 12 Drawing Sheets

(56) References Cited

U.S. PATENT DOCUMENTS

| | | |
|---|---|---|
| 2005/0005047 A1 | 1/2005 | Keeney et al. |
| 2005/0097503 A1 | 5/2005 | Zintel et al. |
| 2005/0108571 A1 | 5/2005 | Lu et al. |
| 2005/0223119 A1 | 10/2005 | Keys |
| 2005/0240685 A1 | 10/2005 | Keys |
| 2005/0240712 A1 | 10/2005 | Klein |
| 2005/0256923 A1 | 11/2005 | Adachi |
| 2006/0015665 A1 | 1/2006 | Illowsky et al. |
| 2006/0101373 A1 | 5/2006 | Bartz et al. |
| 2006/0105712 A1 | 5/2006 | Glass et al. |
| 2006/0143262 A1 | 6/2006 | Cromer et al. |
| 2006/0161617 A1 | 7/2006 | Zhong et al. |
| 2006/0253894 A1 | 11/2006 | Bookman et al. |
| 2006/0291434 A1 | 12/2006 | Gu et al. |
| 2007/0005867 A1 | 1/2007 | Diamant |
| 2007/0139375 A1 | 6/2007 | Rosenberg et al. |
| 2007/0150947 A1 | 6/2007 | Vijayakumar et al. |
| 2008/0270469 A1 | 10/2008 | Myerson et al. |
| 2009/0313397 A1 | 12/2009 | England et al. |

OTHER PUBLICATIONS

Author Unknown, Sun Ray 100—Hardware Specification, Sun System Handbook—CD 2.1.8, Apr. 2005 Internal/Partner Edition.

802

| Bit | Mnemonic | Access | Reset | Definition |
|---|---|---|---|---|
| 31:0 | usbPTDEn | W | 0x00000000 | This Selects which of the PTDs are Active. |

804

| Bit | Mnemonic | Access | Reset | Definition |
|---|---|---|---|---|
| 1:0 | usbMouseEn | W | 0x0 | Enables Mouse Acceleration for Mouse. |
| 9:8 | supressRep | W/R | 0x0 | If 0, then HID ReportIDs that don't Match the Configured Mouse Report ID are Sent to the Host as PTD Accelerated Completions. If 1, then the Message is Silently Dropped. |

806

| Bit | Mnemonic | R/W | Reset | Definition |
|---|---|---|---|---|
| 7:0 | usbMouseRepId_0 | W | 0x00000000 | Selects which Report ID to Enable Mouse Acceleration |
| 12:8 | usbMousePTD_0 | W | 0x00000000 | Selects which PTD No. to Enable Mouse Acceleration |
| 23:16 | usbMouseRepId_1 | W | 0x00000000 | Selects which Report ID to Enable Mouse Acceleration |
| 28:24 | usbMousePTD_1 | W | 0x00000000 | Selects which PTD No. to Enable Mouse Acceleration |

808

| Bit | Mnemonic | Access | Reset | Definition |
|---|---|---|---|---|
| 7:0 | usbScale_0 | W | 0x00000000 | Multiplier Value for Scaling |
| 11:8 | usbShift_0 | W | 0x00000000 | No. Bits to Shift Scaled Value |
| 23:16 | usbScale_1 | W | 0x00000000 | Multiplier Value for Scaling |
| 27:24 | usbShift_1 | W | 0x00000000 | No. Bits to Shift Scaled Value |

810

| Bit | Mnemonic | Access | Reset | Definition |
|---|---|---|---|---|
| 3:0 | usbMerge_0 | W | 0x00000000 | Number of Messages to Merge |
| 7:4 | usbSkip_0 | W | 0x00000000 | Number of Messages to Skip |
| 11:8 | usbMerge_1 | W | 0x00000000 | Number of Messages to Merge |
| 15:12 | usbSkip_1 | W | 0x00000000 | Number of Messages to Skip |

FIG. 8A

| Bit | Mnemonic | Access | Reset | Definition |
|---|---|---|---|---|
| 6:0 | usbPositionX_0 | W | 0x00000000 | The No. of Bits that the X Position Message is Offset from the Start of the Message. |
| 13:8 | usbSizeX_0 | W | 0x00000000 | Size of the X Position Message in Bits |
| 22:16 | usbPositionX_1 | W | 0x00000000 | The No. of Bits that the X Position Message is Offset from the Start of the Message. |
| 29:24 | usbSizeX_1 | W | 0x00000000 | Size of the X Position Message in Bits |

852

| Bit | Mnemonic | R/W | Reset | Definition |
|---|---|---|---|---|
| 6:0 | usbPositionBUT0_0 | W | 0x00000000 | The No. of Bits that the BUT0 Position Message is Offset from the Start of the Message. |
| 13:8 | usbSizeBUT0_0 | W | 0x00000000 | Size of the BUT0 Position Message. |
| 22:16 | usbPositionBUT0_1 | W | 0x00000000 | The No. of Bits that the BUT0 Position Message is Offset from the Start of the Message. |
| 29:24 | usbSizeBUT0_1 | W | 0x00000000 | Size of the BUT0 Position Message in Bits |

854

| Bit | Mnemonic | R/W | Reset | Definition |
|---|---|---|---|---|
| 12:0 | usbMouseMaxExtents_X | W | 0x00000000 | The Signed Maximum X Value of the Screen |
| 18:16 | usbMouseMaxExtents_Y | W | 0x00000000 | The Signed Maximum Y Value of the Screen |

856

| Bit | Mnemonic | R/W | Reset | Definition |
|---|---|---|---|---|
| 12:0 | usbMouseMinExtents_X | W | 0x00000000 | The Signed Minimum X Value of the Screen |
| 18:16 | usbMouseMinExtents_Y | W | 0x00000000 | The Signed Minimum Y Value of the Screen |

858

| Bit | Mnemonic | Access | Reset | Definition |
|---|---|---|---|---|
| 12:0 | usbMouseHotSpot_X | W | 0x00000000 | The X Coordinate of the Hot Spot |
| 18:16 | usbMouseHotSpot_Y | W | 0x00000000 | The Y Coordinate of the Hot Spot |

| Bit | Mnemonic | Access | Reset | Definition |
|---|---|---|---|---|
| 31:0 | usbISOSecMask | W | 0x00000000 | This is the Masking Register to Select which ISO Transfer Needs to be Encrypted. |

1002

| Bit | Mnemonic | Access | Reset | Definition |
|---|---|---|---|---|
| 31:0 | usbINTSecMask | W | 0x00000000 | This is the Masking Register to Select which INT Transfer Needs to be Encrypted. |

1004

| Bit | Mnemonic | Access | Reset | Definition |
|---|---|---|---|---|
| 31:0 | usbATLSecMask | W | 0x00000000 | This is the Masking Register to Select which ATL Transfer Needs to be Encrypted. |

1006

| Bit | Mnemonic | Access | Reset | Definition |
|---|---|---|---|---|
| 31:0 | usbREGSecMask | W | 0x00000000 | This is the Masking Register to Select which REG Transfer Needs to be Encrypted. |

UNIVERSAL SERIAL BUS ASSISTANCE ENGINE

CROSS REFERENCE TO OTHER APPLICATIONS

This application is a continuation of U.S. application Ser. No. 13/566,953 filed Aug. 3, 2012, which is a continuation of U.S. application Ser. No. 12/082,968 filed Apr. 15, 2008 (now U.S. Pat. No. 8,260,985), which claims the benefit of U.S. Provisional Patent Application No. 60/997,842 filed Oct. 5, 2007, the disclosures of which are incorporated herein by reference.

BACKGROUND OF THE INVENTION

The Universal Serial Bus ("USB") standard is a popular bus standard for connecting devices. USB is popular in part because a large selection of devices use it including servers, clients, serial devices, parallel devices, keyboards, mice, language devices, pointing devices, human input devices, video devices, audio devices, printers, scanners, network adapters and voice-over-Internet-Protocol ("VoIP") devices. To allow these devices to function, a USB stack is required including a USB host controller driver.

Thin clients can provide efficient use of compute resources across multiple users and multiple locations. A thin client is made more useful by allowing USB devices to connect to it. However, executing a USB host controller driver on the thin client represents a certain level of complexity and cost for the thin client, and creates a software layer in the thin client that may need updates for new features, bugfixes, or security vulnerabilities. It would be useful to further simplify the thin client to reduce this cost of the thin client system, but still retain the ability to allow USB devices to connect to it.

BRIEF DESCRIPTION OF THE DRAWINGS

Various embodiments of the invention are disclosed in the following detailed description and the accompanying drawings.

FIG. 8A and FIG. 8B are an example of a register map for an assistance engine and message analyzer.

FIG. 10 is an example of a register map for a security engine.

DETAILED DESCRIPTION

Figure 1:
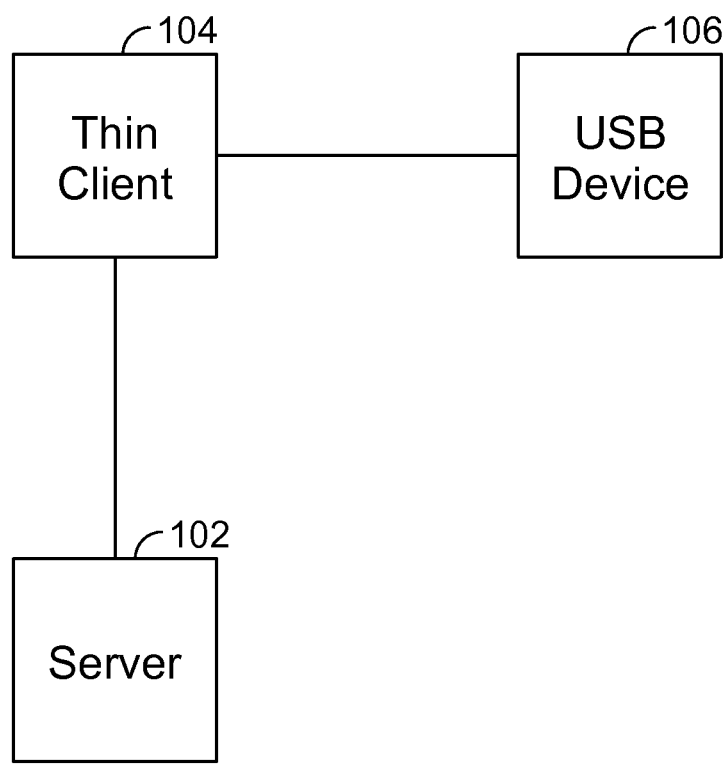
FIG. 1 is a block diagram illustrating an embodiment of a system for USB over a network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

USB host controller driver-level message remoting over a network, USB message extraction, and USB selective encryption are disclosed. Throughout this specification "hardware" refers to any physical configuration of digital circuits to perform a task, including custom silicon integrated circuits, application specific integrated circuits ("ASICs"), field programmable gate arrays ("FPGAs") or programmable logic devices ("PLDs"). Throughout this specification an algorithm or method "practically implementable by hardware" refers to any algorithm or method that is directly, natively or practically realizable by hardware, such that the algorithm or method would completely fit on a single commercially available FPGA or PLD.

Throughout this specification a "driver level message" is a message that is practically implementable by hardware and is one or a combination of control and status register ("CSR") reads, CSR writes, block data transfers, and interrupts. Throughout this specification a "thin client" is practically implementable by hardware and does not require an instruction based processing element, such as a central processing unit ("CPU"), microcontroller unit ("MCU"), or digital signal processor ("DSP".)

In one embodiment a thin network protocol such as the Thinium Network Protocol ("TNP") described in US Patent Pre-Grant Publication US-2008-0010340-A1 "THIN NETWORK PROTOCOL", is used to tunnel driver level messages from a server to a thin client. To reduce costs or resources a thin client may be reduced in complexity such that it can be practically implementable by hardware. The thin client may include a USB host controller. However, because the thin client is practically implementable by hardware, the USB host controller driver may in some embodiments be executed on the server instead of the thin client.

FIG. 1 is a block diagram illustrating an embodiment of a system for USB over a network. In the example shown, server 102 is coupled to thin client 104. Thin client 104 communicates with USB device 106. In some embodiments server 102 and thin client 104 are connected directly through a local bus connection. In some embodiments server 102 and thin client 104 are connected through a network. Throughout this specification, "network" refers to any public or private network and/or combination thereof. A network may include the Internet, an Ethernet, a serial/parallel bus, intranet, local area network ("LAN"), wide area network ("WAN"), or any form of connecting multiple systems and/or groups of systems together. In some embodiments server 102 and thin client 104 are connected through a network by using a thin network protocol ("TNP") over the Internet Protocol ("IP.")

In various embodiments thin client 104 may communicate to USB device 106 using a USB protocol. Throughout this specification the "USB protocol" refers to one of either a wired USB protocol, for example:
USB 1.0;
USB 1.1;
USB 2.0;
USB 3.0; and
PoweredUSB,
or a wireless USB protocol, for example:
WirelessUSB;
Certified Wireless USB ("WUSB");
Ultra-Wideband ("UWB") USB radio platforms; and
Cable-Free USB.

Figure 2A:
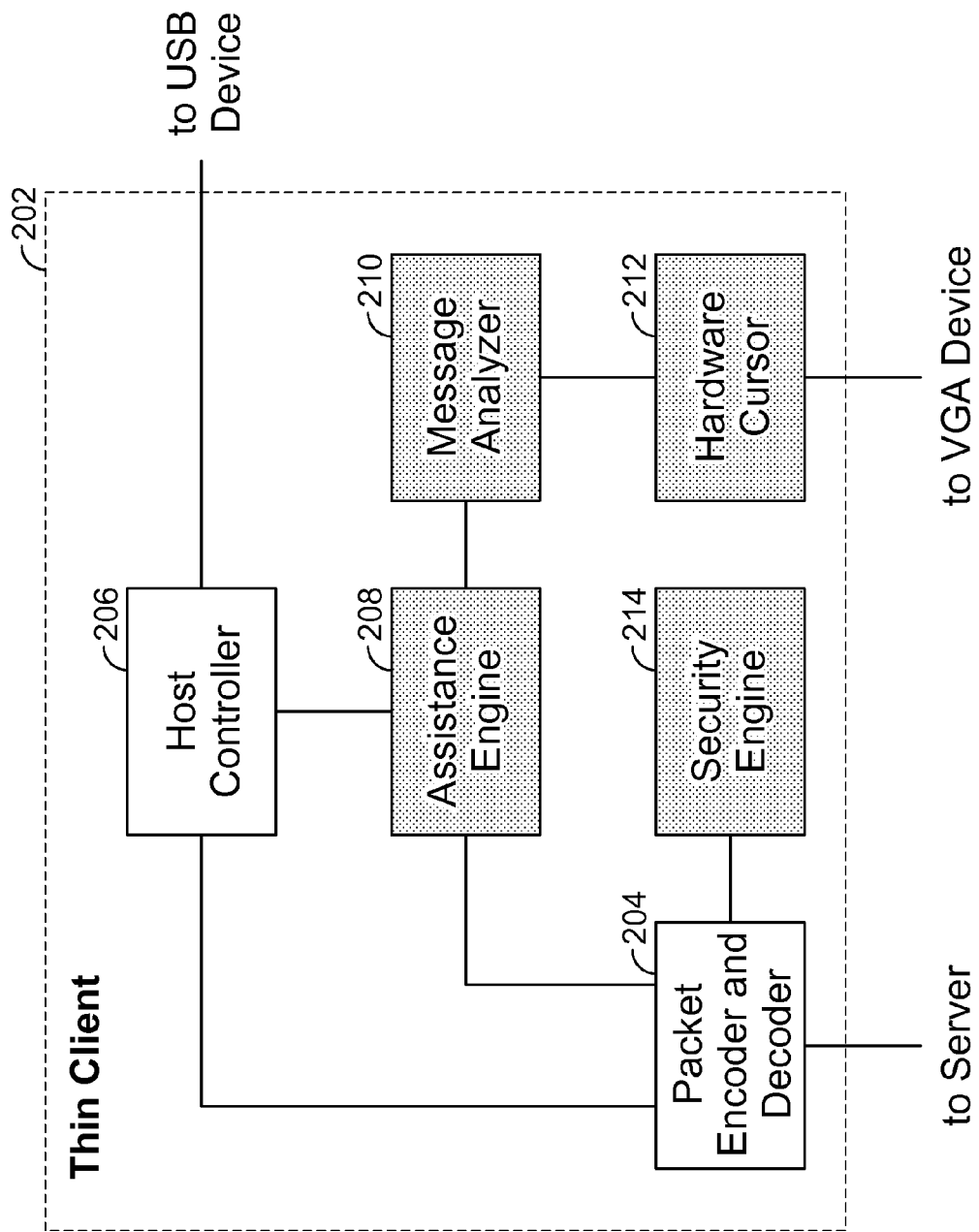
FIG. 2A is a block diagram illustrating an embodiment of a USB system architecture for a thin client.

FIG. 2A is a block diagram illustrating an embodiment of a USB system architecture for a thin client. In some embodiments, the architecture in FIG. 2A is the architecture for thin client 104. In FIG. 2A, optional blocks or systems are denoted by a grey fill and comprise assistance engine 208, message analyzer 210, hardware cursor 212 and security engine 214.

Thin client 202 comprises packet encoder and decoder 204 coupled with host controller 206. Packet encoder and decoder 204 is coupled directly or through a network to server 102. Host controller 206 may be a standard USB host controller coupled through the USB protocol to one or more USB devices 106. The packet encoder and decoder 204 and host controller 206 may also be coupled with the optional assistance engine 208. The assistance engine 208 may be coupled with the optional message analyzer 210, which may be coupled with the optional hardware cursor 212. The hardware cursor 212 is coupled to a graphics display device such as a computer display monitor. The optional security engine 214 may be coupled with the packet encoder and decoder 204. Blocks 204, 208, 210, 212, and 214 may be implemented as separate subsystems or integrated onto a single FPGA or ASIC.

Packet encoder and decoder 204 is a tunneling agent which processes server packets and sends the encapsulated driver level messages to host controller 206. The agent is capable of returning data back to server 102. In the case where events such as interrupts need to be reported from the host controller 206 to the host controller driver, the packet encoder and decoder 204 sends a message back to server 102. An agent on the server side reports the event back to the USB host controller driver stack.

Assistance engine 208 provides a way to respond and resubmit transfer descriptors ("TDs") to USB device 106 based at least in part on transfer descriptors received earlier. By using assistance engine 208, there is a substantial reduction in response time to an interrupt from the host controller 206; instead of using a processor which may not be able to respond to the assertion of the interrupt line immediately, the turnaround time for accessing the USB host controller is substantially smaller when using dedicated hardware 208. As well, eliminating the need to wait for server 102 to parse the TDs before access to the payload means that network traffic is substantially reduced if server 102 and client 104 are coupled via a network. Assistance engine 208 instead parses TDs on the fly when fetched and then encapsulates the payload immediately following the TD fetches for transmission to the server.

Message analyzer 210 increases the responsiveness of thin client 104 to USB device 106 to improve a user's experience. In some embodiments the message analyzer 210 is configured to parse USB device 106 as a pointing device. Throughout this specification "pointing device" refers to any input device that includes a cursor basis, including one or more of a: mouse, touchpad, pointing stick, trackball, light pen, touchscreen, graphics tablet, light gun, joystick, and dance pad. Throughout this specification "cursor" refers to both:
  spatial data in one or more dimensions, for example, X-Y coordinates on a two-dimensional plane, or Z-coordinates from a scroll wheel; and
  event data from one or more triggers, for example a button click, double-click, drag, chording, or rocker.

Message analyzer 210 improves the responsiveness to a pointing device by parsing cursor data from the pointing device at thin client 104 instead of transferring each result of the pointing device interrupt transfer to the server and then transmitting a cursor update from server 102 to thin client 104.

Message analyzer 210 parses a subset of the data from the pointing device directly to reduce roundtrip network latency and reduces the user's perception that the pointing device is sluggish when used in conjunction with assistance engine 208. In some embodiments, message analyzer 210 parses a proper subset of the data from the pointing device, wherein throughout this specification a "proper subset" defines a portion of a given set of data that is strictly contained in the data, and thus there exists at least one element of data which is not contained in the portion. When the message analyzer 210 parses the data and positions the pointing device, response to a pointer device movement feels instantaneous. Cursor data is still sent to server 102, so that user interface elements can be rendered in response to pointing device movements as well as other software interactions with the pointer.

To accomplish pointing device processing with the message analyzer 210, server 102 must parse the initial USB Human Interface Device ("HID") descriptors. Server 102 determines which offsets in the pointing device interrupt transfers contain spatial coordinate data, for example X and Y coordinate data. It also determines the range of these values. Server 102 configures thin client 104 by configuring assistance engine 208 and message analyzer 210 with these offsets and ranges. Server 102 also sets the initial pointer location and may update it from time-to-time in response to software requests.

Once assistance engine 208 is configured, it submits USB interrupt transfer requests to the pointing device 106. When the pointing device 106 moves and the message analyzer 210 receives the data from the interrupt transfer, it uses the configuration information received from server 102 to parse the data from the pointing device 106. In some embodiments, the position of hardware cursor 212 is then updated. Message analyzer 210 also sends a position update to server 102. The assistance engine 208 resubmits the interrupt transfer to handle additional pointer device position updates.

Hardware cursor 212 reflects cursor information canonically stored at server 102. Rendering a reflected pointer locally at thin client 104 improves a user's experience by enhancing the perception of responsiveness. The hardware cursor 212 comprise one or more of a:

pointer memory region to store the bitmap of the current pointer representation for rendering. The current pointer representation may include, for example, a bitmap of an arrow, hourglass, or crosshair;

pointer block transfer command to copy data from a source region to the pointer memory region for rendering. The pointer size and stride may be variable or fixed;

set of registers indicating the screen extents including the minimum and maximum coordinates of the usable pointer screen for screen clipping and multi-monitor output; and set of registers indicating the current pointer "hotspot"; the singularity in space used to represent the cursor during events like button clicks, within the bitmap of the current pointer.

Security engine 214 allows for selective security and encryption of USB for thin client 104. After an interrupt, the resulting TD and associated data are transferred from the client to the host. Security engine 214 enables this transfer to be secure or encrypted, and furthermore encryption may be selectively turned on or off. This allows only sensitive USB transfers to be encrypted, leaving non-sensitive transfers unencrypted, resulting in saving of compute power or electrical power. For example, a particular embodiment may consider that all mouse transactions are not sensitive and need not be encrypted, while transactions from another USB device may be encrypted.

In one embodiment, a security policy is selective encryption based on the type of TD. Encryption may use an appropriate key exchange algorithm such as RSA, and an appropriate encryption algorithm such as Advanced Encryption Standard ("AES") to encrypt the data.

The memory space for host controller 206 is accessible from the server through the network stack. In some embodiments it is important to protect access via encryption. Security engine 214 facilitates a writable register to specify the base address that would require encryption. When a server accesses an address base larger or equal to the set address value in this register, the encryption out-of-band signal is asserted.

Figure 2B:
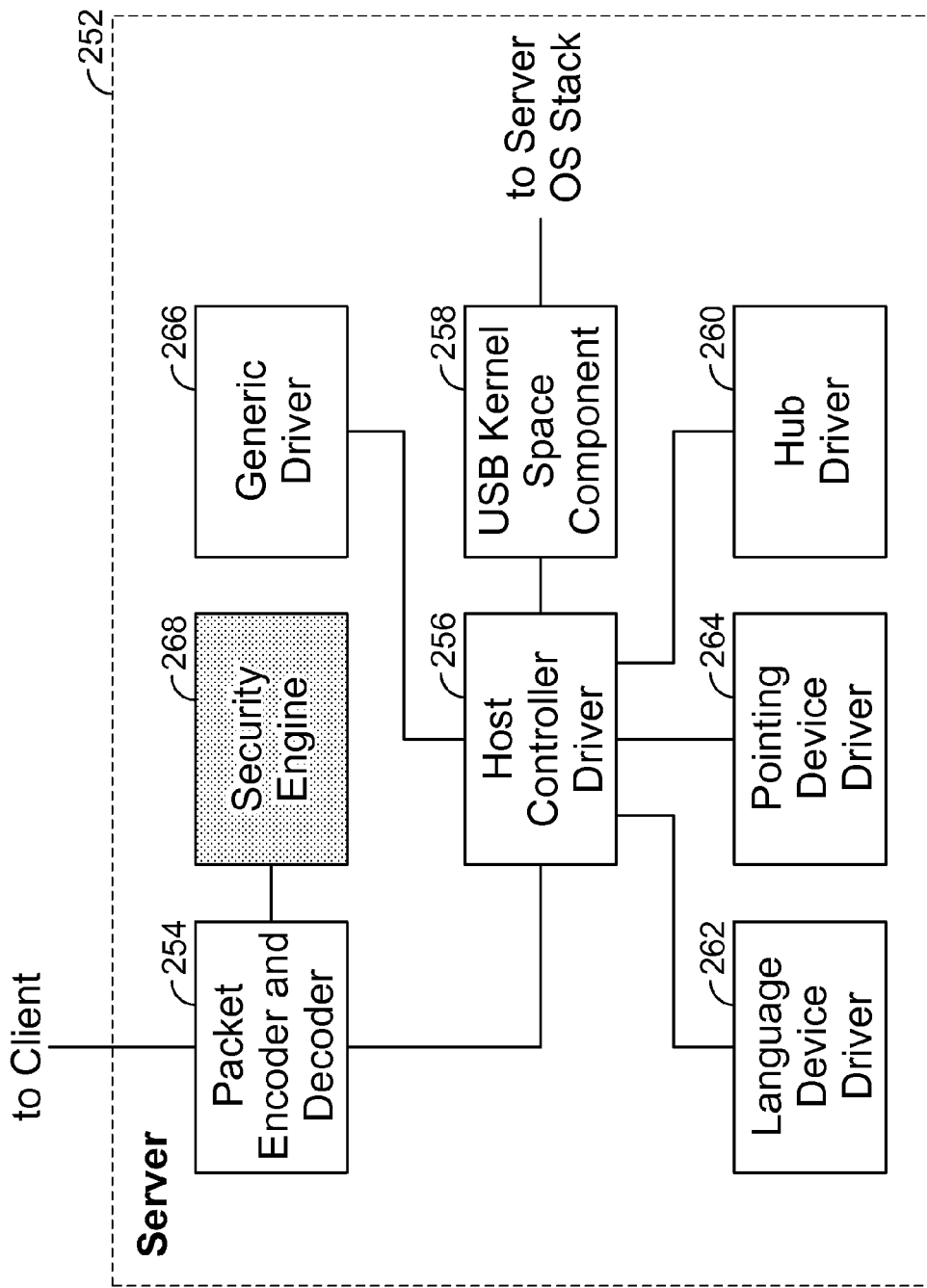
FIG. 2B is a block diagram illustrating an embodiment of a USB system architecture for a server.

FIG. 2B is a block diagram illustrating an embodiment of a USB system architecture for a server. In some embodiments, the architecture in FIG. 2B is the architecture for server 102. In FIG. 2B, optional blocks or systems are denoted by a grey fill and comprise security engine 268.

Server 252 comprises packet encoder and decoder 254, which is coupled to host controller driver 256 and optional security engine 268. Host controller driver 256 is coupled with USB kernel space component 258, hub driver 260, language device driver 262, pointing device driver 264 and generic driver 266. Throughout this specification, a "language device" refers to any language-based input device including one of a: keyboard, handwriting recognition pad, number pad, keypad, predictive language keypad, speech recognition device, and motion recognition device. Packet encoder and decoder 254 is coupled to thin client 104's packet and encoder and decoder 204 either directly or through a network. USB kernel space component 258 is coupled to the server's operating system ("OS") stack.

Packet encoder and decoder 254 is a tunneling agent which processes client packets and sends the encapsulated driver level messages to host controller driver 256. The agent is capable of returning data back to the client 104. In the case where events such as interrupts need to be reported from the host controller 206 to the host controller driver 256, the packet encoder and decoder 254 receives the message from client 104 via its agent 204.

Host controller driver 256 is a driver for host controller 206. A "host controller driver" is defined throughout this specification as a driver that takes messages from other drivers in a system (for example, a mouse driver or keyboard driver) and transfers them to hardware in a manner that is consistent with the hardware's communication requirements. In some embodiments, a host controller driver is a driver that takes messages from other drivers in a system and transfers them to hardware in a manner that is not only consistent but also sufficient with the hardware's communication requirements. In some embodiments, the USB stack implementation is a mix of user mode and kernel mode components, each having different responsibilities and roles. The user mode stack is a combination of hub and host controller driver and receives notifications of changes on the USB ports. Once a device is enumerated on a USB port on the client device, the stack decides whether to handle it in the user mode or to pass it along to a kernel mode bus driver which will create a device that appears into the server system. Because the goal is to make certain HID devices (for example, a keyboard and mouse) attached to the client work for a non-console session on the server, the hybrid stack processes input devices locally in the user mode subsystem. If the newly connected device is anything other then an input device, it passes it along to the kernel mode driver. Handling language device and pointing device input such as keyboard and mouse input at the user level enables passing input to the session with which the user is interacting, otherwise it would pass the input to the console session, invisible to the user.

USB kernel space component 258 comprises a virtual bus driver to manage the creation and deletion of USB devices in the system. In some embodiments, the OS used is MICROSOFT WINDOWS based and because no USB controller hardware is discovered by the OS during installation, the native OS USB stack is not loaded by default. The virtual bus driver is a kernel mode driver that simulates a USB bus and manages devices that show up on that bus. In this example, the computer network acts as a bus and the driver needs to plug into the network stack in order to be able to communicate with the USB hardware and devices attached to it.

When devices are plugged into the client, the hardware relays this notification over the network to the software running on the operating system, a user mode subsystem called "PanoDAS". The bus driver is notified of the presence of a new device. The software also provides the bus driver with information about the USB device's device, interface, and other descriptors. The bus driver can further query various other string descriptors in order to facilitate the creation of an actual device into the operating system.

The bus driver uses an Input-Output Control ("IOCTL") interface to the PanoDAS. This is a private interface and is used by the PanoDAS to inform the bus driver of device plug and unplug notifications. This interface is also used by the bus driver to communicate with the device which includes extracting various descriptors and data transfers. PanoDAS assigns addresses to each device that it discovers and these are used by the bus driver to uniquely identify each device on the virtual bus. As part of its responsibilities, the Bus driver also handles the plug-and-play (PNP) related requests that the operating system sends down to query and set the state of the device.

The creation of a device into the system requires the bus driver to provide a hardware identifier ("ID") and a Compatible ID for the device. In some embodiments, these are required by the MICROSOFT WINDOWS operating system to help locate a suitable driver for the device and placing the driver in the right stack.

In these embodiments using MICROSOFT WINDOWS, the Hardware ID is of format USB\\Vid_XXXX&Pid_XXXX&Rev_XXXX\0 and the Compatible ID is of format USB\\Class_00&SubClass_00&Prot_00\0. In the Hardware ID, the Vid number is the Vendor ID of the USB device and is retrieved from the device descriptor of the device and is placed after "Vid_", replacing the XXXX. Similarly the Pid represents the Product ID and Rev represents the Revision No. These are also retrieved from the device descriptor. Compatible ID uses Class, SubClass and Protocol information from the Interface Descriptor of the device.

The bus driver creates a Physical Device Object ("PDO") for this device with the appropriately formed strings and re-enumerates the bus. This leads to the OS discovering the presence of a new device on the bus and it immediately locates and loads a suitable driver, if found, for this device. For example, if a USB thumb drive is plugged into thin client 104, the OS will find a match in the USBStor.sys driver and this driver will be loaded.

Once the correct driver for this device is loaded, the driver first configures and then operates the device. It does so by sending USB Request Blocks ("URBs") and other IOCTL requests down to the PDO of the device. The URBs are used to obtain various descriptors and do data transfers to and from the device. Since the virtual bus driver owns the PDO of this USB device, it observes all of these requests coming down from the driver (UsbStor.sys in case of mass storage devices).

The bus driver parses these URBs and submits the appropriate request to the device over the network. On the other end the hardware parses these requests and submits them directly to the USB hardware. When a device is detached from the system, the hardware detects it and sends a notification. This results in the bus driver notifying the operating system and removing the PDO from the bus. The bus driver must also ensure there are no pending requests on the PDO. If any are pending, they must be finished before it can remove the device.

Hub driver 260 is the generic driver for one or more USB hubs internal to thin client 104 and/or USB hubs attached to external USB ports or connectors on thin client 104. In some embodiments, three external USB ports are used for thin client 104.

Language device driver 262 and pointing device driver 264 are designed to be compatible with the assistance engine 208, message analyzer 210 and hardware cursor 212 to facilitate TD resubmission or parsing pointing device cursor data. A generic driver 266 is provided for transient states to facilitate OS drivers for non-language and non-pointing devices, for example mass storage devices. Security engine 268 reciprocates with security engine 214 to allow for selective security and encryption of USB data between server 102 and thin client 104.

Figure 3:
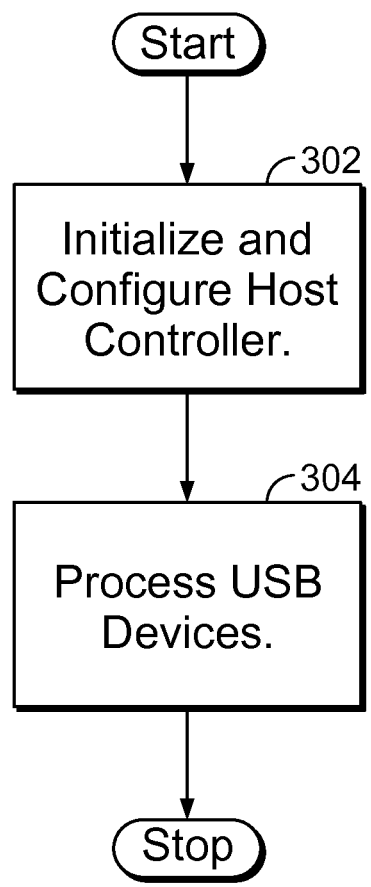
FIG. 3 is a flow chart illustrating an embodiment of a process for USB over a network.

FIG. 3 is a flow chart illustrating an embodiment of a process for USB over a network. This process may be implemented between server 102 and thin client 104 from FIG. 1. In the example shown, the process starts at step 302 and ends after step 304.

In step 302, server 102 initializes the host controller 206 on thin client 104. This is required before, for example, a mouse or keyboard can be "enumerated", meaning both detected and initialized.

In step 304, the assistance engine 208, message analyzer 210, and/or server 102 begin processing USB devices that become attached to host controller 206. These USB devices include for example, keyboard, mice and storage devices.

Figure 4:
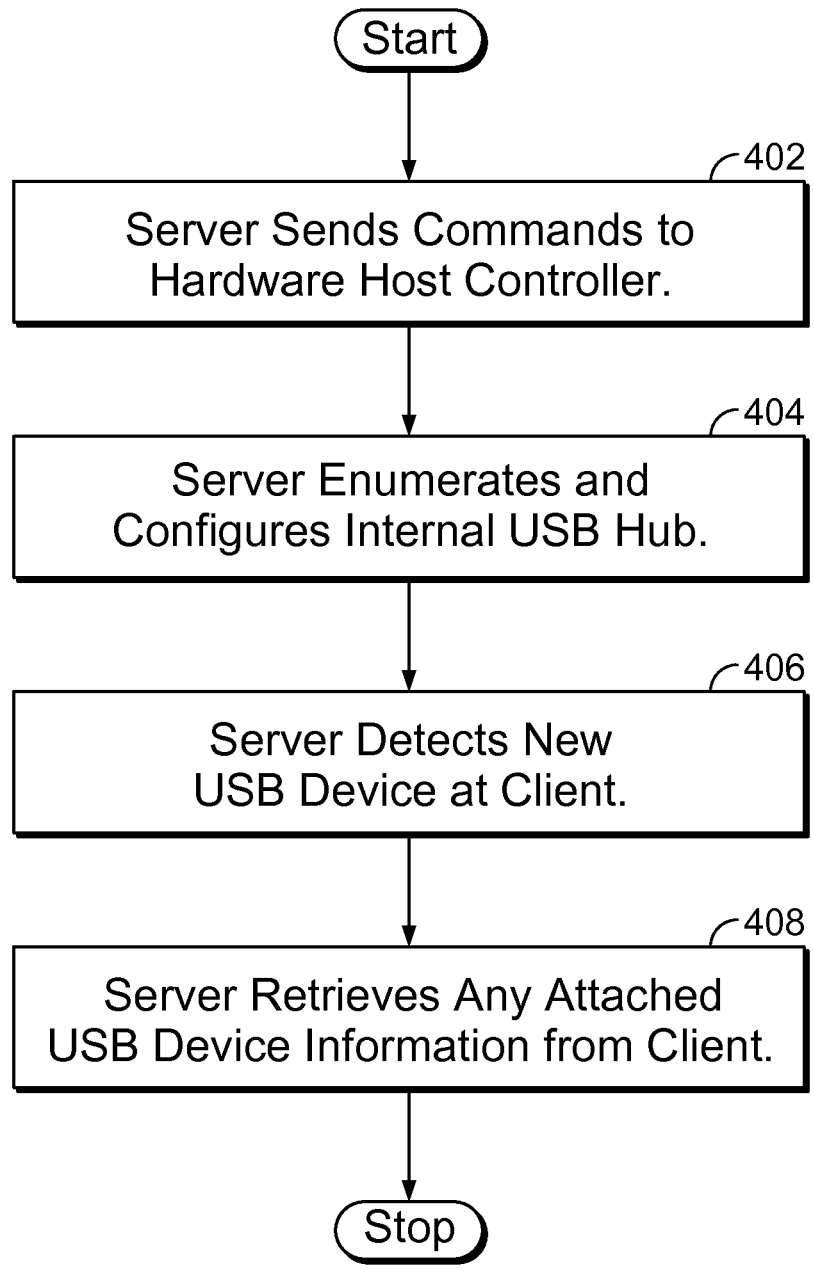
FIG. 4 is a flow chart illustrating an embodiment of a process for initializing a USB host controller.

FIG. 4 is a flow chart illustrating an embodiment of a process for initializing a USB host controller. This process may be implemented in step 302 of FIG. 3. In the example shown, the process starts at step 402 and ends after step 408.

In step 402, server 102 issues a series of instructions to initialize the host controller 206. On thin client 104, the instructions resolve to a series of register reads and writes of the hardware host controller 206. This one-time configuration sets parameters such as width of the data bus, analog or digital overcurrent detection, and device-specific hardware configuration.

In step 404, server 102 enumerates and configures the internal USB hub at thin client 104. Server 102 sends a series of instructions to the host controller 206 that result in transactions on the USB bus. These transactions initialize the USB hub. Before this configuration takes place, server 102 and thin client 104 cannot communicate with any USB devices attached to thin client 104.

In step 406, server 102 detects that a USB device 106 has been plugged into thin client 104 and determines to configure it. In this case, the internal hub notifies the server that a device has been plugged into the thin client and the server configures it.

In step 408, server 102 issues commands to retrieve the USB device, configuration, and interface descriptors of the attached device 106. These descriptors inform server 102 of the type of device 106 attached.

Figure 5:
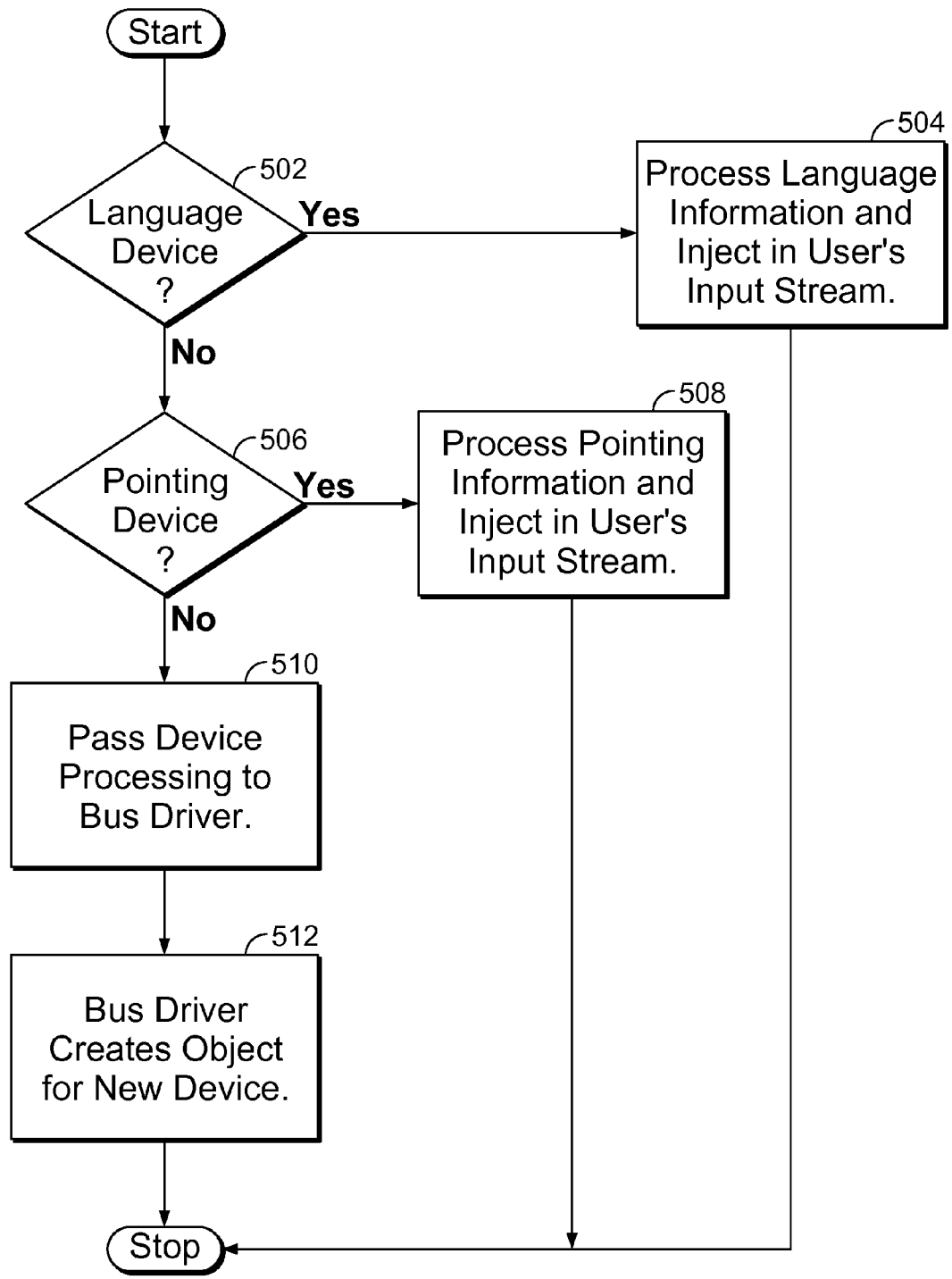
FIG. 5 is a flow chart illustrating an embodiment of a process for processing USB devices using a hybrid USB stack.

FIG. 5 is a flow chart illustrating an embodiment of a process for processing USB devices using a hybrid USB stack. This process may be implemented in step 304 of FIG. 3. In the example shown, the process starts at step 502 and ends after steps 504, 508, or 512.

If it is determined at step 502 that a USB device 106 that has been plugged in during step 406 is a language device, then control is transferred to step 504; otherwise, control is transferred to step 506. In step 504, the language information is processed. For example, if a keyboard is plugged in, the keystrokes are processed. The keystrokes are then injected in a user's input stream.

If it is determined at step 506 that a USB device 106 that has been plugged in during step 406 is a pointer device, then control is transferred to step 508; otherwise, control is transferred to step 510. In step 508, the pointing information is processed. For example, if a mouse is plugged in, the cursor data is processed. The cursor data is then injected in a user's input stream.

In step 510, as the device is neither a language device nor a pointing device, it is assigned a generic driver 266 in a transient state. Device processing is passed to the virtual bus driver in USB kernel space component 258. In step 512, the virtual bus driver creates an object for the new device from server 102. The user mode retains generic driver 266 as a handle to the device.

Figure 6:
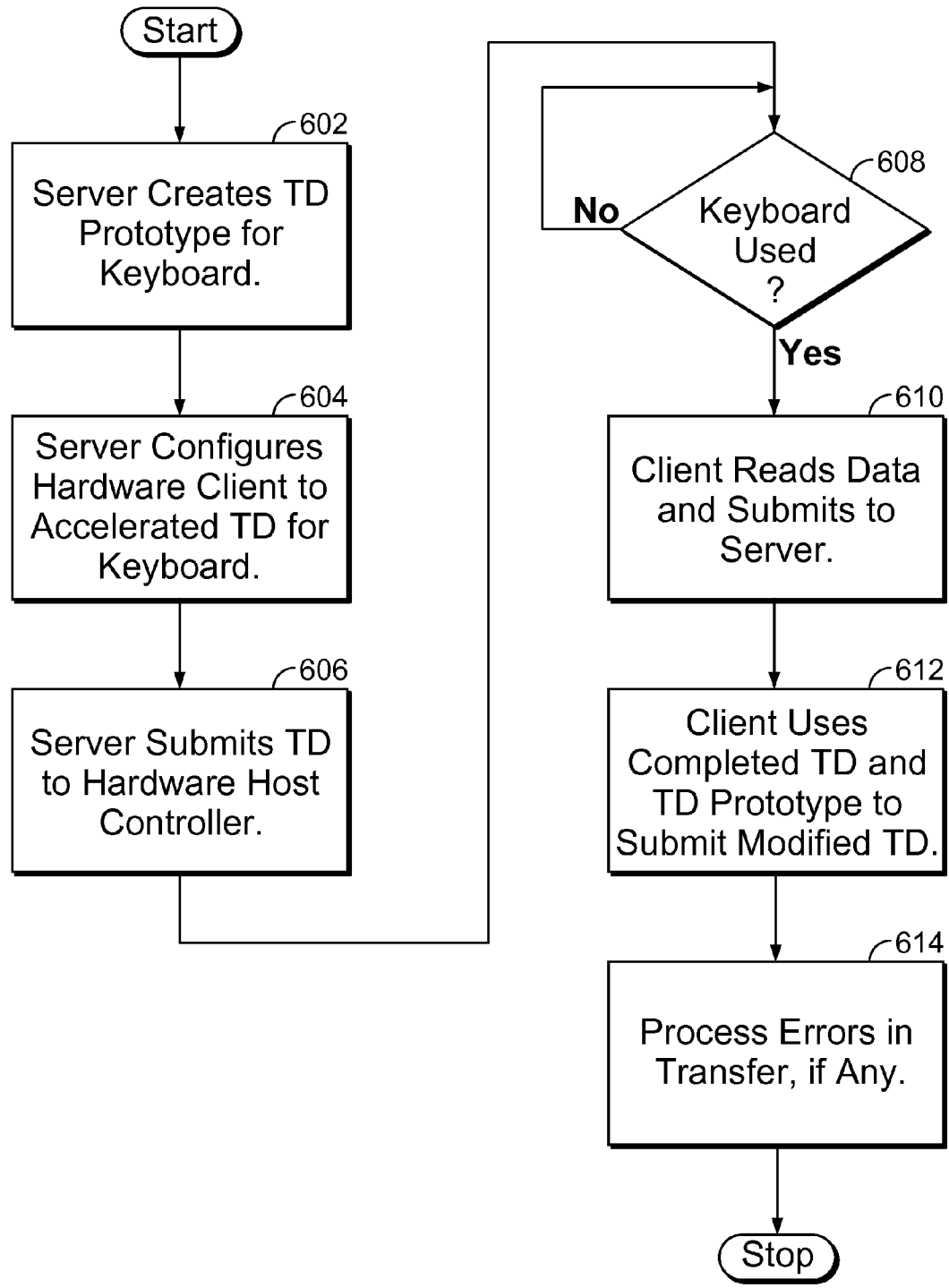
FIG. 6 is a flow chart illustrating an embodiment of a process for processing USB language devices.

FIG. 6 is a flow chart illustrating an embodiment of a process for processing USB language devices. For the purposes of illustration, it will be assumed that the device attached is a keyboard, but the example is generalized without limitation to any language device. This process may be implemented in step 304 of FIG. 3 and step 504 of FIG. 5. In the example shown, the process starts at step 602 and ends after step 614.

In step 602, server 102 creates a prototypical Transfer Descriptor and writes it to the host controller 206. This TD has a numerical index associated with it, "tID x". In step 604, server 102 configures assistance engine 208, telling it that the Transfer Descriptor with tID x should be accelerated. In step 606, server 102 submits the Transfer Descriptor to the host controller 206.

If it is determined in step 608 that a key is pressed on the keyboard, then control is transferred to step 610; otherwise control continues to wait at step 608. In step 610, the host controller 206 signals (via an interrupt) assistance engine 208 that data is available. Assistance engine 208 reads the data from the host controller 206 and sends the data to server 102. Server 102 processes the data and sends it up through the software stack to the OS.

In step 612, assistance engine 208 uses the completed Transfer Descriptor along with the Prototypical Transfer Descriptor and a collection of fixed transformation rules to submit a modified Transfer Descriptor to the host controller 206. This step happens without intervention from server 102.

In step 614, if an error occurs in any transfer, assistance engine 208 transfers the error result to server 102 and does not automatically submit a new Transfer Descriptor. Server 102 handles the error, which may involve restarting the automatic submission beginning with step 602 above. The removal of the keyboard from the bus appears as an error that would not result in a restart.

Figure 7:
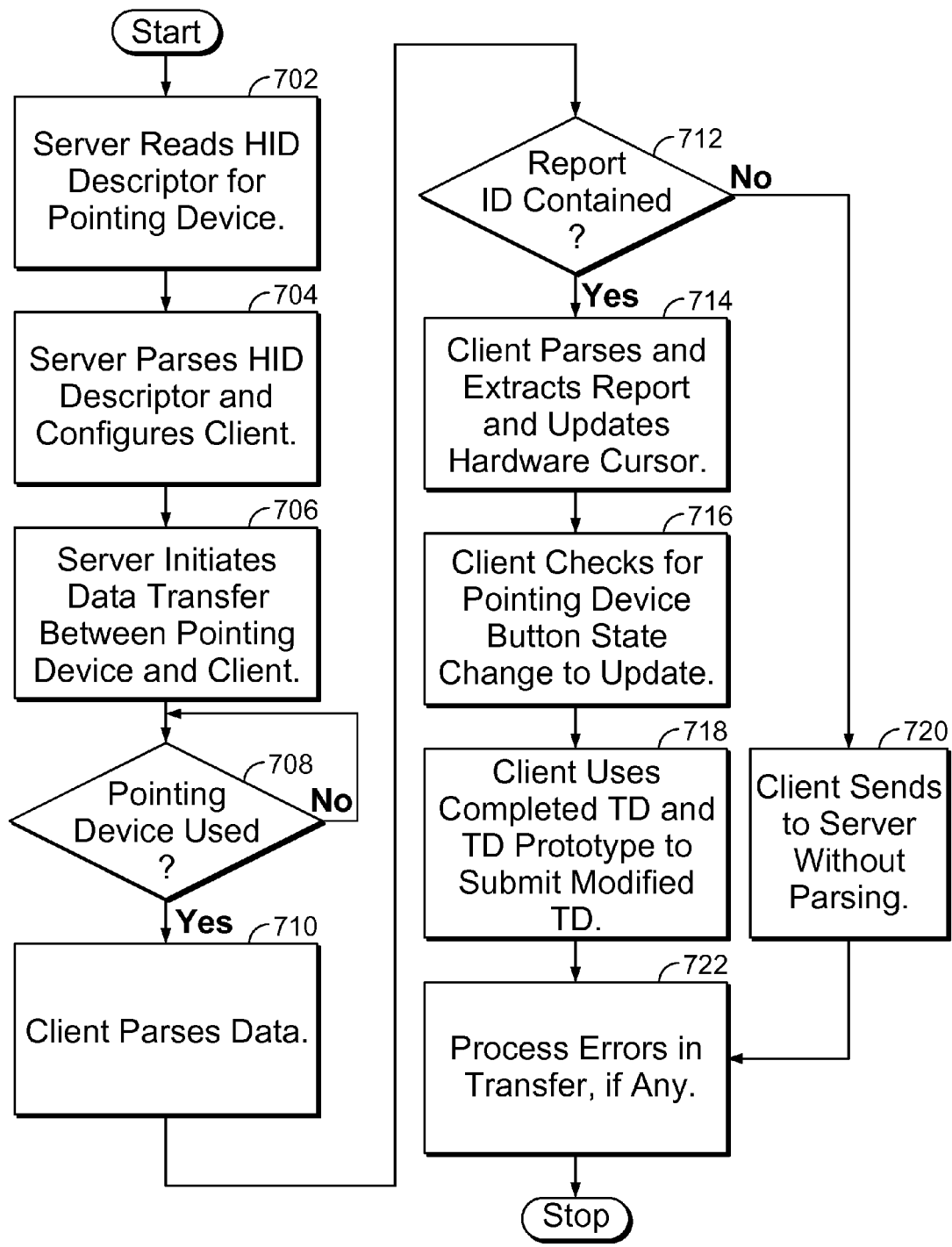
FIG. 7 is a flow chart illustrating an embodiment of a process for USB information extraction.

FIG. 7 is a flow chart illustrating an embodiment of a process for USB information extraction. For the purposes of illustration, it will be assumed that the device attached is a mouse, but the example is generalized without limitation to any pointing device. This process may be implemented in step 304 of FIG. 3 and step 508 of FIG. 5. In the example shown, the process starts at step 702 and ends after step 722.

In step 702, server 102 reads the mouse's Human Interface Device (HID) descriptor. This descriptor includes information on how the data sent from the mouse are formatted.

In step 704, server 102 parses the HID descriptor and configures message analyzer 210 with information including the location of the spatial coordinates such as x and y coordinates, and event data, such as scroll wheel and button data, within a specific HID report.

In step 706, server 102 initializes data transfer between the pointing device and the client. Server 102 first creates a prototypical Transfer Descriptor and writes it to the host controller 206. This TD has a numerical index associated with it, "tID x". Server 102 then configures assistance engine 208, telling it that the Transfer Descriptor with tID x should be accelerated. Server 102 finally submits the Transfer Descriptor to the host controller 206. Mouse processing leverages TD acceleration.

If it is determined in step 708 that a the mouse was moved or one of its buttons or scroll wheel is clicked, then control is transferred to step 710; otherwise control continues to wait at step 708. In step 710, the host controller 206 signals (via an interrupt) assistance engine 208 that data is available. Assistance engine 208 parses the data and verifies that it contains the configured report ID.

If it is determined in step 712 that the data contains the configured report ID, control is transferred to step 714; otherwise control is transferred to step 720. In step 714, message analyzer 210 parses the report and extracts the change in spatial data, for example x and y coordinate, as well as information on event data, for example the scroll wheel and button state. Hardware cursor 212 is updated to reflect the internal position of the pointer and renders the screen display with a new representation of the pointer.

In step 716, if the mouse button has changed state from the previous report, message analyzer 210 immediately sends the current mouse position and button state to server 102. Otherwise, it determines if the configured time since the last position update has elapsed and may send the update to server 102. The message to server 102 is the absolute position of the cursor: the result of all the mouse movement message analyzer 210 has received. The position updates are the same for all mice and their format is independent of the format of the USB mouse data.

In step 718, assistance engine 208 uses the completed Transfer Descriptor along with the Prototypical Transfer Descriptor and a collection of fixed transformation rules to submit a modified Transfer Descriptor to the host controller 206. This step happens without intervention from server 102.

In step 720, message analyzer 210 does not attempt to parse the data. Rather, the host controller 206 first signals (via an interrupt) assistance engine 208 that data is available. Assistance engine 208 reads the data from the host controller 206 and sends the data to server 102. Server 102 processes the data and sends it up through the software stack to the OS. Assistance engine 208 then uses the completed Transfer Descriptor along with the Prototypical Transfer Descriptor and a collection of fixed transformation rules to submit a modified Transfer Descriptor to the host controller 206. This step happens without intervention from server 102.

In step 722, if an error occurs in any transfer, assistance engine 208 transfers the error result to server 102 and does not automatically submit a new Transfer Descriptor. Server 102 handles the error, which may involve restarting the automatic submission beginning with step 602 above. The removal of the mouse from the bus appears as an error that would not result in a restart.

FIG. 8A and FIG. 8B are an example of a register map for an assistance engine and message analyzer. The registers for assistance engine 208 and message analyzer 210 may be stored within their respective systems or elsewhere in thin client 202.

Register 802 is an example of a PTD acceleration enable register, where a bit could be asserted to enable PTD acceleration for a given PTD ID. Register 804 is an example of a USB pointing device acceleration enable register, where a bit could be asserted to enable the pointing device acceleration for a plurality of pointing devices, in this example two mice. The register also allows HID report IDs that do not match the configured device report ID to be sent to the host as PTD accelerated completions or silently dropped to reduce power consumption or network bandwidth.

Register 806 is an example of a ID register for a plurality of pointing devices, in this example two mice. The register stores for each pointing device channels the report ID and the mouse PTD. Register 808 is an example of a scale register for a plurality of pointing devices, in this example two mice. Pointing device scaling allows for pointing device motion acceleration by scaling the "delta" or raw pointing device velocity by a multiplier shifted by a specified number of bits. Register 810 is an example of a frequency register for a plurality of pointing devices, in this example two mice. The frequency register controls how often messages are sent from message analyzer 210 to server 102, and controls merging of a plurality of messages to reduce bandwidth between thin client 104 and server 102.

Register 852 is an example of a register to store a spatial message for one dimension for a plurality of pointing devices, for example the X position message for two mice. Other examples include registers for Y position messages and Z position messages.

Register 854 is an example of a register to store an event message for one type of event for a plurality of pointing devices, for example the first button message for two mice.

Other examples include registers for second, third and fourth button messages or scroll wheel button messages.

Register 856 is an example of a register to store the maximum coordinates for the screen extents for hardware cursor 212. Register 858 is an example of a register to store the minimum coordinates for the screen extents for hardware cursor 212. Register 860 is an example of a register to store the hotspot for hardware cursor 212.

Figure 9:
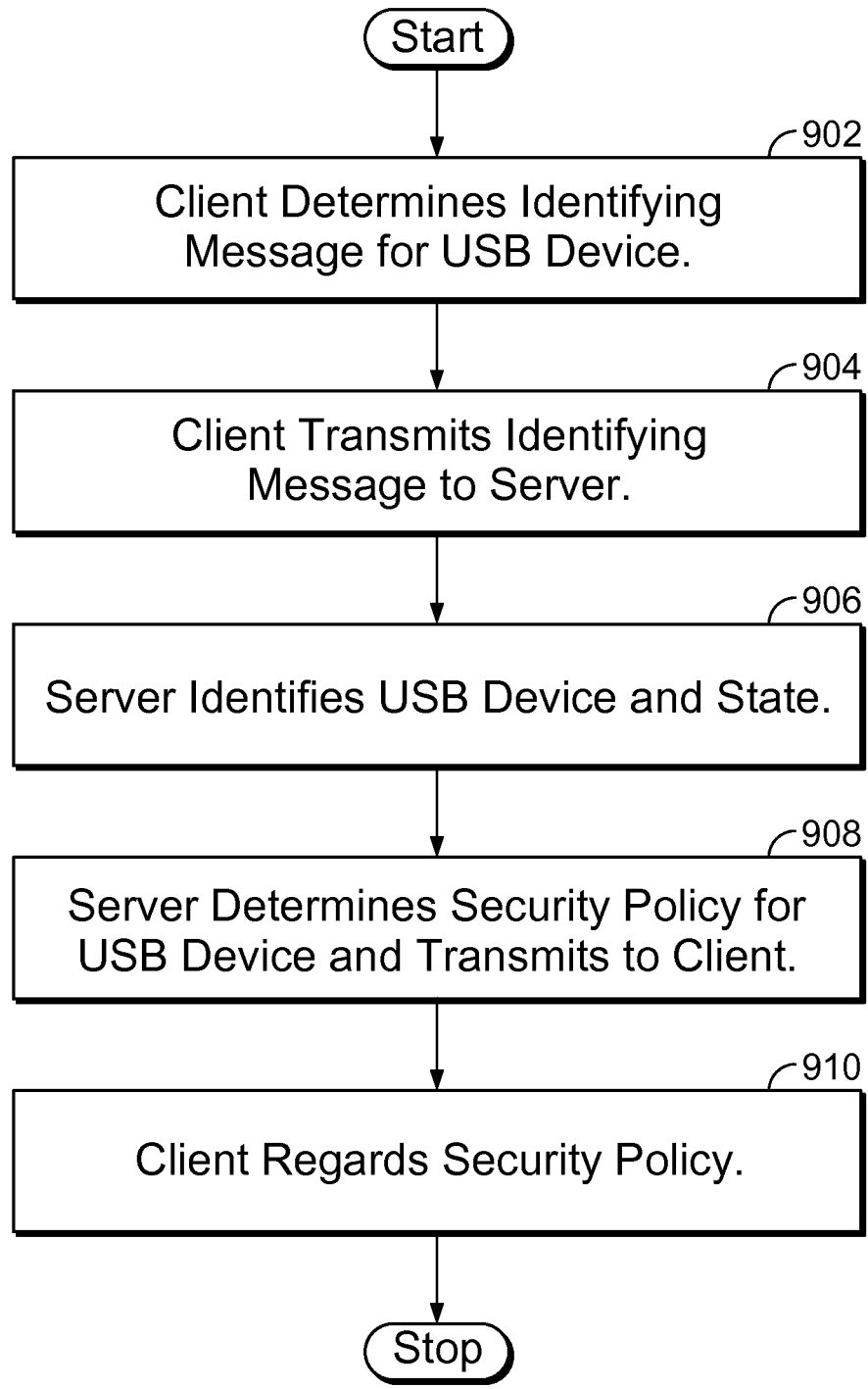
FIG. 9 is a flow chart illustrating an embodiment of a process for USB selective encryption.

FIG. 9 is a flow chart illustrating an embodiment of a process for USB selective encryption. This process may be implemented in security engine 214 of FIG. 2A and security engine 268 of FIG. 2B. In the example shown, the process starts at step 902 and ends after step 910.

In step 902, security engine 214 determines an identifying message for the USB device 106, for example the completion of a particular TD. In step 904, the security engine 214 transmits the identifying message to security engine 268. In step 906 the security engine 268 identifies the USB device 106 and state, for example whether it is a mouse, or whether it is a keyboard and the keyboard user is entering a password. In some embodiments only the USB device 106 is identified and the state is not identified.

In step 908, the security engine 268 determines the security policy for the USB device 106 and state, and transmits an indication of the security policy back to security engine 214. In some embodiments, the state if any is ignored. In some embodiments, nothing is transmitted to the client if no further security action is necessary. In step 910, the client then regards the security policy. In some embodiments the security policy is to encrypt USB data traffic between thin client 104 and server 102. In some embodiments, encryption uses an appropriate key exchange algorithm like RSA, and an encryption algorithm like AES-128 to encrypt the data.

FIG. 10 is an example of a register map for a security engine. The registers for security engine 214 may be stored within its respective system or elsewhere in thin client 202.

Register 1002 is an example of a register to flag whether a particular isochronous USB transfer is to be encrypted. Register 1004 is an example of a register to flag whether a particular interrupt USB transfer is to be encrypted. Register 1006 is an example of a register to flag whether a particular bulk or Asynchronous Transfer List ("ATL") USB transfer is to be encrypted. Register 1008 is an example of a register to select when access of registers and memory space of the host controller 206 is to be encrypted. Access to or from register and memory space larger that the contents of the example register need to be encrypted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A server configured to interact with a remote Universal Serial Bus ("USB") device comprising:
   a host controller driver for the remote USB device;
   an outbound interface to transmit a configuration for predetermination from the host controller driver to:
   1) a message analyzer that is associated with the remote USB device and configured to extract information from a subset of a message comprising a USB Human Interface Device (HID) report associated with the remote USB device based at least in part on the configuration for predetermination; and
   2) an assistance engine that is associated with a remote USB host controller and configured to resubmit a USB descriptor to the remote USB host controller after the message analyzer extracts, wherein the resubmission is based at least in part on the configuration for predetermination and a past USB descriptor received earlier; and
   an inbound interface to receive a message from the message analyzer for the host controller driver.

2. A server as recited in claim 1, wherein the message comprises an extracted information from the message analyzer.

3. A server as recited in claim 1, wherein the message comprises a message from the remote USB device.

4. A server as recited in claim 1, wherein the message comprises an aggregate of extracted information from a plurality of messages from the remote USB device.

5. A method to interact with a remote Universal Serial Bus (USB) device comprising:
   transmitting a configuration for predetermination to:
   1) a message analyzer that is associated with the remote USB device and configured to extract information from a subset of a message comprising a USB Human Interface Device (HID) report associated with the remote USB device based at least in part on the configuration for predetermination; and
   2) an assistance engine that is associated with a remote USB host controller and configured to resubmit a USB descriptor to the remote USB host controller after the message analyzer extracts, wherein the resubmission is based at least in part on the configuration for predetermination and a past USB descriptor received earlier; and
   receiving a plurality of messages from the message analyzer; and
   performing a host controller driver service for the remote USB device.

* * * * *